June 7, 1932.  G. R. ROE ET AL  1,862,239
FERTILIZER APPLICATOR
Filed Sept. 8, 1931
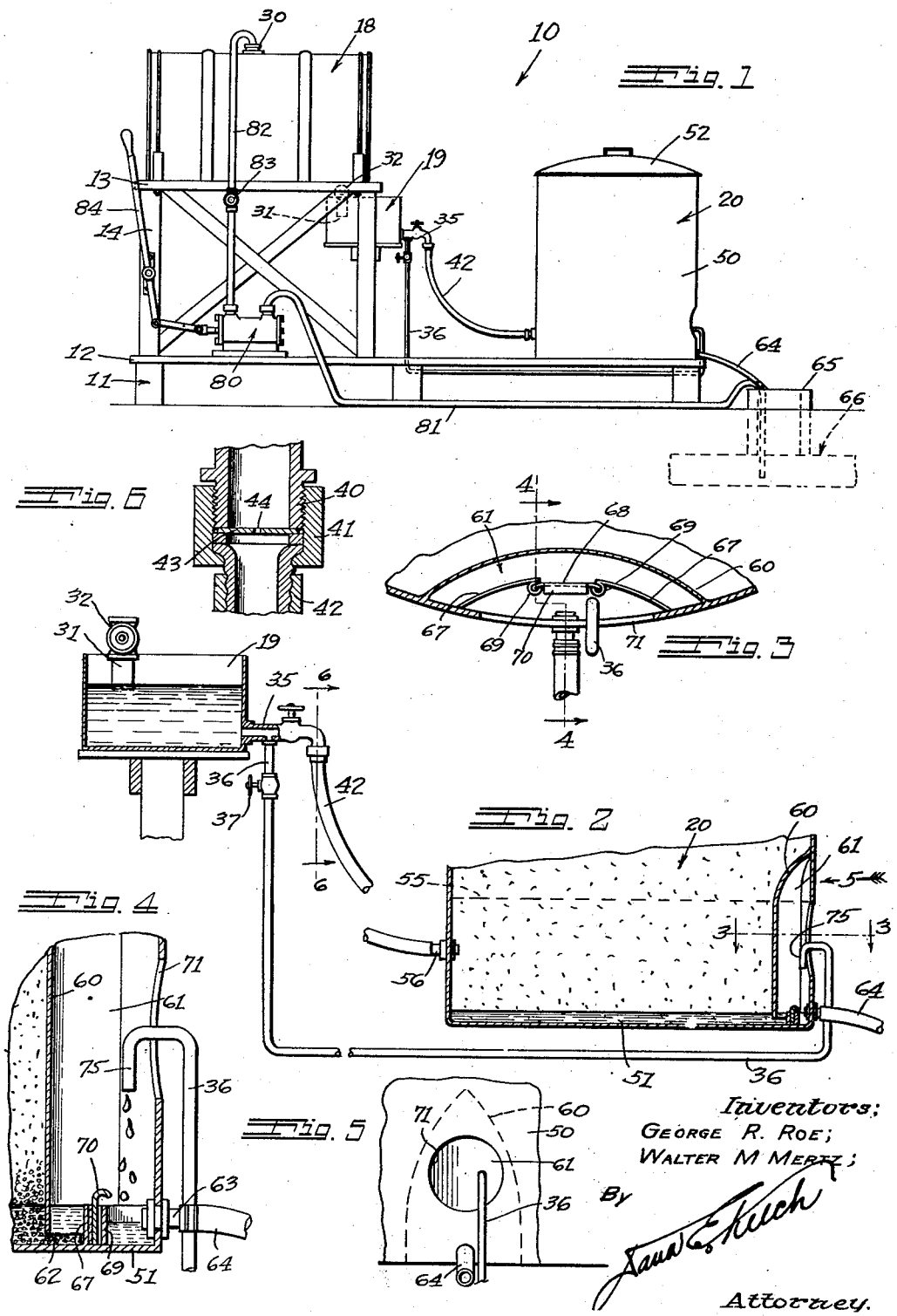

Patented June 7, 1932

1,862,239

UNITED STATES PATENT OFFICE

GEORGE R. ROE, OF POMONA, AND WALTER M. MERTZ, OF ONTARIO, CALIFORNIA

FERTILIZER APPLICATOR

Application filed September 8, 1931. Serial No. 561,522.

Our invention relates to fertilizer applicators, and more particularly to means for applying a soluble fertilizer to the soil through a gravity, furrow irrigation system.

Among available plant foods are a number of soluble fertilizers which, because of their solubility, tend to "leach out" of the soil and become lost to the plants if not absorbed quickly by the latter. These fertilizers are accordingly more advantageously used when applied often but in small quantities and widely diffused. Means have been devised for accomplishing this through irrigation water.

Present irrigation practices are largely restricted to two methods: the old furrow system of running the water directly onto the land; and the overhead sprinkler system. The first mentioned method is still in general use, this probably being due, in a measure, to the expense of installing and operating the sprinkler system.

The complete control of the water as to pressure, flow, etc., in the sprinkler system makes it readily adaptable to serve the distribution of soluble fertilizer. In the open ditch system, however, the pressure and flow of water varies considerably and the only portable means provided to overcome this, prior to our invention, was a power driven feeding arrangement requiring an electric motor or a gasoline engine. This expedient rendered the applicator embodying it too costly for general use.

Accordingly, it is an object of our invention to provide a fertilizer applicator for operation with furrow irrigation systems which will be relatively inexpensive both in first cost and cost of operation.

A disability inherent in the more successful of previous applicators for furrow systems was the fact that the applicator had to be built into the water conduit delivering water to the system and hence could be used only with that one irrigating system.

Another object of our invention is to provide a fertilizer applicator for use with furrow irrigation systems which is a separate entity and is adapted to be transported from place to place and readily used in conjunction with any furrow irrigating system.

In our copending application, Ser. No. 504,488, filed Dec. 24, 1930, we have disclosed a soluble fertilizer applicator for accomplishing the foregoing objects. The present invention is an improvement on the embodiment of our invention shown in the aforesaid copending application.

In said embodiment it was necessary that certain valve parts and screen be subjected to the action of a solution of the chemical fertilizer. It has been found, under conditions in actual use, that certain chemicals corrode these more delicate parts so as to impair their effectiveness unless they are made of fairly expensive chemical resisting materials.

Accordingly it is an object of our invention to provide an improved soluble fertilizer applicator in which no relatively delicate parts are subjected to action of a solution of chemical.

It is a further object of our invention to provide a soluble fertilizer applicator which is simple and inexpensive in construction.

Yet another object of our invention is to provide a soluble fertilizer applicator which, at the end of a run, may be easily flushed to remove all of the chemical therefrom.

The manner of accomplishing the foregoing objects as well as further objects and advantages will be made manifest in the following description, taken in connection with the accompanying drawing in which, Figure 1 is a side elevation of the device.

Figure 2 is an enlarged vertical section of a part of the device showing the constant rate water feeding tank, the chemical container and the various connections therebetween.

Figure 3 is an enlarged sectional view taken on the line 3—3 of Fig. 2.

Figure 4 is a sectional view taken on the line 4—4 of Fig. 3.

Figure 5 is a fragmentary end view of the chemical container and

Figure 6 is a sectional view taken on the line 6—6 of Fig. 2.

Referring specifically to the drawing, the invention is shown embodied in a fertilizer applicator 10 and includes a frame 11, including a platform 12 upon which a higher platform 13 is supported by a super-structure 14.

The principal operative elements of the applicator 10 includes a reservoir drum 18 which is supported on the platform 13, a water pressure regulating basin 19 supported on the super-structure 14 beneath the drum 18, and a chemical container 20 which rests upon the platform 12.

The reservoir 18 is preferably a standard fifty-gallon metal drum having an airtight filling plug 30 and a discharge pipe 31 preferably about one and one-half inches in diameter and which extends directly downwardly from the drum. The pipe 31 is provided with a manually operated valve 32.

The basin 19 is mounted just beneath the discharge pipe 31 and has a faucet 35 provided in the wall thereof near the bottom of the basin. Connecting with the faucet 35 between the valve portion of the faucet and the basin 19 is a pipe 36 having a valve 37, the purpose of which will be made manifest hereinafter. The faucet 35 has a bibb 40 which is adapted to be connected by a union 41 with a hose 42. For a purpose which will be made manifest hereinafter, a series of weirs 43 are provided, one of which is shown in Fig. 6, each of these weirs having an opening 44 of a particular size.

The chemical container 20 is preferably embodied in the form of a cylindrical tank having vertical walls 50, and a substantially horizontal bottom 51, the upper end of the container being open and adapted to be closed by a cover 52.

A lower portion of the container 20, in fact that portion of this tank which is disposed below the dotted line 55 in Fig. 2, is preferably formed of Monel metal or some other chemical resistant material.

Mounted in the wall 50 and extending therethrough a short distance above the bottom 51 is a water inlet pipe 56 to which the hose 42 is connected.

Provided in the opposite side of the container 20 from the pipe 56, on the inner face of the cylindrical wall 50, is a partition 60 which curves inwardly at its upper end so as to enclose a solution separating chamber 61. The lower end 62 of the partition 60 is disposed a short distance above the bottom 51 of the container 20. Mounted in the wall 50 within the chamber 61 near the bottom 51 is a small pipe 63 to which is connected a hose 64 which is adapted to deliver solution to a stand pipe 65 of an underground irrigation system 66.

Provided on the container bottom 51 is a riffle wall 67 which is provided with a gateway 68, adjacent ends of the wall 67 having guides 69 provided thereon to snugly receive and retain in place a gate 70 which is adapted to be inserted in these guides as clearly shown in Figs. 2 and 4.

The riffle wall 67 is disposed in spaced relation between the partition 60 and the pipe 63 for dispensing solution, and rises to a height which is considerably above the lower edge 62 of the wall 60 for a purpose which will be made manifest hereinafter.

Formed in the wall 50 of the container 20 and opening into the chamber 61 is an opening 71, shown in Fig. 5. The pipe 36 extends downwardly beneath the platform 12 and lengthwise thereunder to a position adjacent the opening 71 in the container 20, then extends upwardly and inwardly into this opening, the inner end 75 of the pipe turning downwardly over the space in the chamber 61 between the riffle wall 66 and the solution dispensing pipe 63.

Mounted on the frame 11, for filling the reservoir 18, is a pump 80 having a hose 81 which is adapted to be extended into the stand-pipe 65, and an exhaust pipe 82 which extends upwardly and is connected to the filler plug 30 so as to open into the reservoir 18. Provided in the pipe 82 is a valve 83. The pump is also provided with a handle 84 which is pivotally mounted on the frame 11 and by which the pump is adapted to be manually operated.

The operation of our invention is as follows:

The entire applicator 10 is portable and may be used in connection with any open irrigation system, such as the irrigation system 66. In the present instance it has been set down, as shown in Fig. 1, by the stand-pipe 65 with the solution dispensing hose 64 extended over the stand-pipe 65. The valve 32 having been closed and the valve 83 opened, the pump 80 is operated to draw water from the stand-pipe 65 and fill the drum 18. The valve 83 is now closed and the valve 32 is opened. This results in the water in the drum 18 being air-locked so that it is discharged through the pipe 31 only when air bubbles are admitted upwardly through this pipe. When the basin 19 becomes filled to above the level of the pipe 31, therefore, the descent of water from the drum into this basin is temporarily stopped. Thus water is maintained in the basin 19 up to the level shown in Fig. 2 as long as any water remains in the drum 18.

A sufficient quantity of soluble fertilizer chemical is now placed in the container 20 for fertilizing the area to be irrigated by the system 66. The faucet 35 is now opened so that water flows from the basin 19 through the weir opening 44 and passes down the hose 42 into the chemical in the container 20. This water flows across the bottom 51 of the container and dissolves the chemical, forming a fertilizing solution. This solution flows beneath the lower edge 62 of the partition 60 into the solution separating chamber 61. As the gate 70 is normally shoved down against the tank bottom 51, very little solution is permitted to pass beneath this gate, and the level of solution in the container 20 rises to the level of the upper end of the riffle wall 67 before getting past this wall in any appreciable quantity.

As the operation proceeds, there is a flow of solution over the riffle wall 67 equal to the flow of water through the orifices 44 in the weir plate 43, and this solution is dispensed through the pipe 63 and the hose 64 into the stand-pipe 65, through which the irrigating water passes on its way to be distributed on the land. As irrigation is generally done in an underground system, such as the system 66, with a given rate of flow of water so that the irrigating of a given area is completed in a specified time, and as the feeding of the chemical from the container 20 to the irrigating water is in proportion to the amount of water passing through the weir plate 43, the choice of weir plates 43 depends on the rate at which it is desired to feed chemical into the stand-pipe 65, that is, each of the series of weir plates 43 used with a device 10 has an orifice 44 of such a size as will result in the dispensing of so many pounds of a given type of chemical per hour.

Where a chemical is dispensed at a fairly slow rate, or in cold weather, the valve 37 is opened slightly so that water drips from the end 75 of the pipe 36 into the solution in the separating chamber 61. This prevents recrystallization of the chemical in the solution and ensures the separating chamber being kept free for the passage of solution therethrough.

When the end of a run is approached and only a small amount of chemical remains in the bottom of the container 20 the weir plate 43 may be removed from the hose coupling 41, the gate 70 removed from the riffle wall 67, and the container 20 tilted slightly in the direction of the chamber 61 so that a full stream of water can be run through the container and all the remaining chemical flushed therefrom and through the hose 64 into the stand-pipe 65.

It is thus seen that we have produced a valuable improvement in soluble fertilizer applicators, as the applicator 10 is simple and inexpensive to construct and as there are no delicate parts, such as screens or valve parts, floats, or the like, which come in contact with the solution and the efficacy of which is impaired by corrosion. The lower part of the container 20 and all the parts thereof which come in contact with the solution are formed of chemical resisting material, such as Monel metal, while, of course, the hose 64 is formed of rubber.

While we have shown and described herein but a single embodiment of our invention, it is to be understood that various changes and modifications might be made therein without departing from the spirit of the invention or the scope of the appended claims.

What we claim is:

1. In a fertilizer applicator, the combination of: a water reservoir; a chemical container disposed at a lower level than said reservoir; constant pressure means for feeding water from said reservoir by gravity to said chemical container at a uniform rate of flow; and means for conducting the solution thus formed from said chemical container into an irrigation system by gravity.

2. In a fertilizer applicator, the combination of: a water reservoir; a chemical container disposed at a lower level than said reservoir; a system between said reservoir and said container for conducting water from said reservoir to said container; a weir in said system for regulating the flow of water therein; means between said reservoir and said weir for regulating the pressure of said water and causing water to be delivered from said reservoir to said weir under a uniform pressure; and means for conducting the solution thus formed from said chemical container into an irrigation system by gravity.

3. A combination as in claim 1 in which said chemical container comprises a tank having substantially vertical walls and a relatively horizontal bottom; a partition wall provided on certain of said tank walls and spaced from the bottom of said tank to provide a solution separating chamber; and means for dispensing solution from said chamber to an irrigation system.

4. In a fertilizer applicator, the combination of: a chemical container comprising a tank having substantially vertical side walls, a substantially horizontal bottom, and a partition provided on certain of said side walls for partitioning off a solution separating chamber, the lower edge of said partition being spaced from the bottom of said tank; means for dispensing solution from said chamber to an irrigation system; a riffle wall provided on said floor in said chamber in spaced relation between said partition and dispensing means, said wall extending above the lower edge of said partition and acting as a baffle to exclude crystals of chemical from passing underneath said partition and into said dispensing means; and means for supplying water to said tank to form a solution of chemical disposed in said tank.

5. In a fertilizer applicator, the combination of: a chemical container comprising a tank having substantially vertical side walls, a substantially horizontal bottom, and a partition provided on certain of said side walls for partitioning off a solution separating chamber, the lower edge of said partition being spaced from the bottom of said tank; means for dispensing solution from said chamber to an irrigation system; baffle means disposed in said chamber in spaced relation between the lower edge of said partition and said solution dispensing means to prevent chemical crystals being carried by said solution from said tank underneath said partition and into said solution dispensing means; and means for supplying water to said tank to form a solution of chemical disposed in said tank.

6. In a fertilizer applicator, the combination of: a chemical container comprising a tank having substantially vertical side walls, a substantially horizontal bottom, and a partition provided on certain of said side walls for partitioning off a solution separating chamber, the lower edge of said partition being spaced from the bottom of said tank; means for dispensing solution from said chamber to an irrigation system; baffle means disposed in said chamber in spaced relation between the lower edge of said partition and said solution dispensing means to prevent chemical crystals being carried by said solution from said tank underneath said partition and into said solution dispensing means; means for supplying water to said tank to form a solution of chemical disposed in said tank; and means for supplying fresh water to the solution in said solution separating chamber to prevent crystallization of said solution.

7. A combination as in claim 4 in which a gate is provided in said riffle wall to facilitate the flushing of the bottom of said tank.

8. A combination as in claim 5 in which said solution separating chamber is disposed at one side of said tank.

9. A combination as in claim 5 in which said solution separating chamber is disposed at one side of said tank and in which water is supplied to said chemical at the opposite side of said tank.

10. In a fertilizer applicator, the combination of: a chemical container having substantially vertical side walls and a substantially horizontal bottom; means for supplying a relatively small stream of water with a uniform flow to the chemical at one side of said tank; means at the opposite side of said tank for separating the solution formed by said water from the crystals of chemical in said tank; and means for dispensing said solution by gravity into an irrigating system.

11. In a fertilizer applicator, the combination of: a chemical container having substantially vertical side walls and a substantially horizontal bottom; means for supplying a relatively small stream of water with a uniform flow to the chemical at one side of said tank; means at the opposite side of said tank for separating the solution formed by said water from the crystals of chemical in said tank; means for dispensing said solution by gravity into an irrigating system; and means for preventing crystallization taking place in said solution in said tank after it has been separated from the chemical in said tank.

12. In a fertilizer applicator, the combination of: a uniform pressure basin; means for maintaining a supply of water in said basin at a substantially uniform level; a chemical container disposed at a lower level than said basin; means for conducting water from said basin to said chemical container at a uniform rate of flow; means for separating a solution formed in said container from the chemical crystals disposed therein; and means for dispensing solution thus separated into an irrigating system.

13. In a fertilizer applicator, the combination of: a uniform pressure basin; means for maintaining a supply of water in said basin at a substantially uniform level; a chemical container disposed at a lower level than said basin; means for conducting water from said basin to said chemical container; a weir provided in said means for regulating the flow of water from said basin to said chemical container; means for separating a solution formed in said container from the chemical crystals disposed therein; and means for dispensing solution thus separated into an irrigation system.

14. A combination as in claim 12 in which means is provided for conducting water from said basin by gravity into said solution after it is separated from the chemical in said container to prevent recrystallization taking place in said solution.

In testimony whereof, we have hereunto set our hands at Ontario, California, this 2nd day of September, 1931.

GEORGE R. ROE.
WALTER M. MERTZ.